April 30, 1957 C. A. LOVELL ET AL 2,790,849

MOTOR CONTROL FOR MOTOR-DRIVEN TELEPHONE DESIGNATION TRANSMITTERS

Filed Jan. 22, 1952 2 Sheets-Sheet 1

INVENTORS C. A. LOVELL
N. D. NEWBY

BY G. F. Kane

ATTORNEY

INVENTORS C. A. LOVELL
N. D. NEWBY
BY A. F. Kane
ATTORNEY

United States Patent Office 2,790,849

Patented Apr. 30, 1957

2,790,849

MOTOR CONTROL FOR MOTOR-DRIVEN TELEPHONE DESIGNATION TRANSMITTERS

Clarence A. Lovell, Summit, and Neal D. Newby, Leonia, N. J., assignors to Bell Telephone Laboratories, Incorporated, New York, N. Y., a corporation of New York Application January 22, 1952, Serial No. 267,626

8 Claims. (Cl. 179—8.5)

Figure 1:
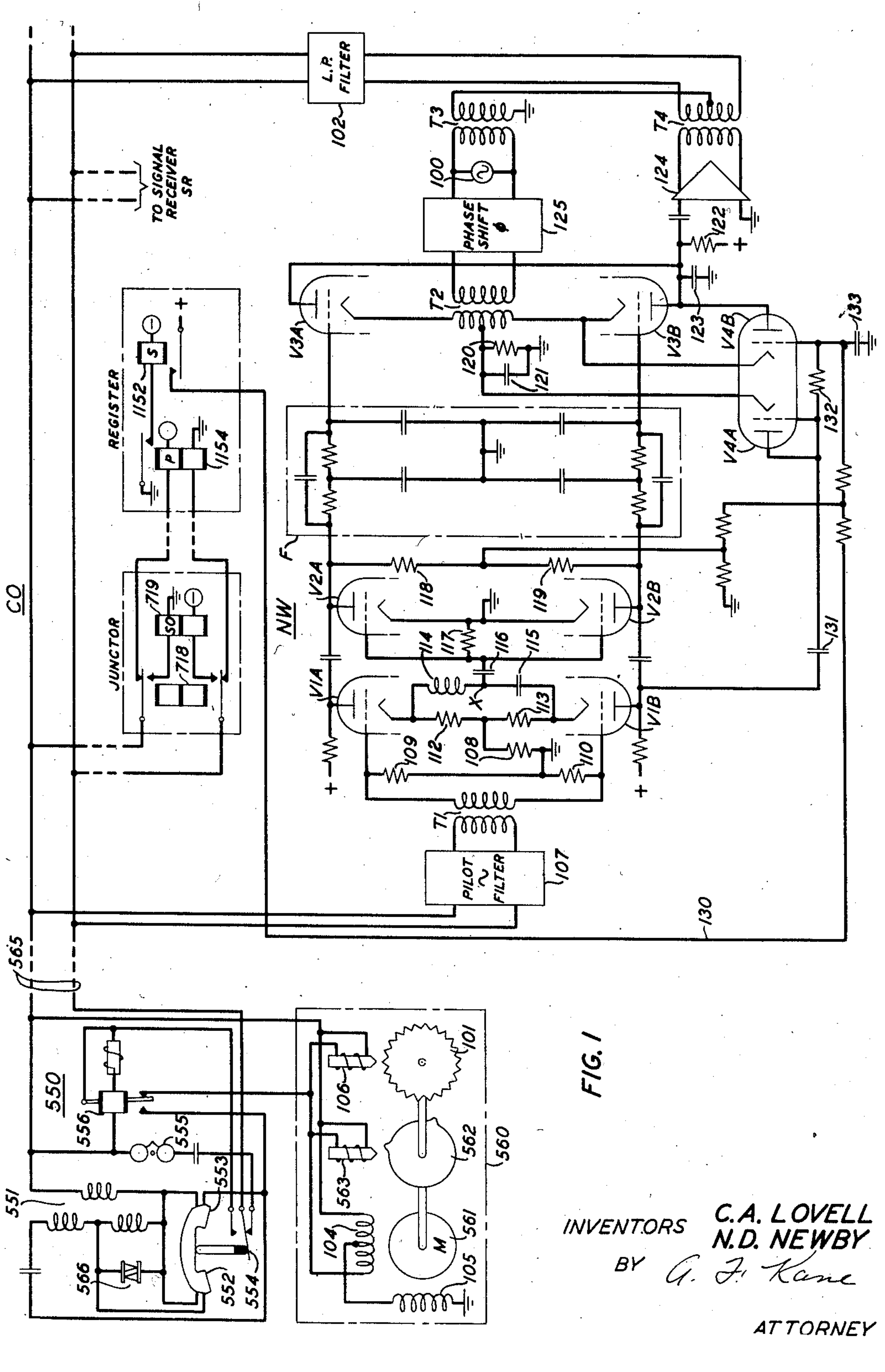

This invention relates to automatic telephone systems in which high speed motor-driven impulse generators, or dialing devices are employed at calling subscribers' stations for generating and transmitting station-identifying impulses.

In a copending application of C. A. Lovell and D. B. Parkinson, Serial No. 35,926, filed June 29, 1948 which issued March 4, 1952 as Patent 2,587,635, there is disclosed an impulse generating or dialing device in which the complete telephone station designation of a called station may be set prior to the initiation of a call and in which the signals or pulses representing the designation are generated and transmitted at a high rate of speed. The use of this type of dialing device reduces the time and attention required by the user, minimizes the probability of error and materially lessens the holding time of the central office equipment which responds to the transmitted impulses. The impulse generating device of the above-identified copending applicaiton is motor-driven and is suitable for use in high speed dialing systems of the type disclosed, for example, in a copending application of W. A. Malthaner, Serial No. 35,925, filed June 29, 1948, which issued December 2, 1952 as Patent 2,620,399. In the system of the latter application the power source employed to operate the driving motor is located at the subscriber's station.

It is the object of this invention to simplify and otherwise improve telephone systems of the high speed dialing type which involve motor-driven impulse-generating, or dialing devices.

This object is attained in accordance with one feature of the invention by supplying the impulse generator-driving motor, located at the subscriber's station, with power from a source located at the central office.

In accordance with another feature of the invention a pilot frequency, or wave generated under control of the subscriber's driving motor is transmitted from the subscriber's station to the central office and there employed to control the power used to drive the motor.

A further feature of the invention contemplates the use of means at the central office for measuring the frequency of the pilot wave; detecting any variation thereof from a predetermined frequency; and adjusting, accordingly, the power transmitted from the central office source to drive the motor. More particularly, the speed of the driving motor is indicated by the frequency of an alternating-current voltage generated by a toothed wheel rotor fixed to the shaft of the motor to be controlled, which voltage is transmitted to the central office over the subscriber's line. The frequency of the control signal is used at the central office to derive a control voltage the magnitude and polarity of which represent, respectively, the magnitude and direction of the deviation of the motor shaft from a predetermined normal speed. The voltage thus derived is used to control the power sent out from the central office over a control channel in such a way that the speed of the motor is held substantially constant at its normal value.

A still further feature of the invention contemplates the use of a normally balanced modulator bridge circuit for normally precluding the transmission of motor-driving power to the subscriber's station and of motor-start means responsive to the initiation of a call at the subscriber's station for effecting a condition of unbalance in the modulator bridge and a resulting application of motor-driving power to the line extending to the subscriber's station to start the motor. A related feature provides for the automatic disabling of the motor-start means when the pilot frequency generated at the subscriber's station reaches the predetermined value.

Still another feature of the invention resides in the use of a two-phase motor at the subscriber's station for driving the impulse generator, and a single phase source of power at the central office, with means at the central office for subjecting the aforementioned modulator bridge to the influence of a 90-degree out-of-phase component of the power source in a manner such that only during periods of unbalance of the bridge is motor-driving power from the said out-of-phase power component transmitted to the subscriber's station to drive the motor thereat.

Figure 2:
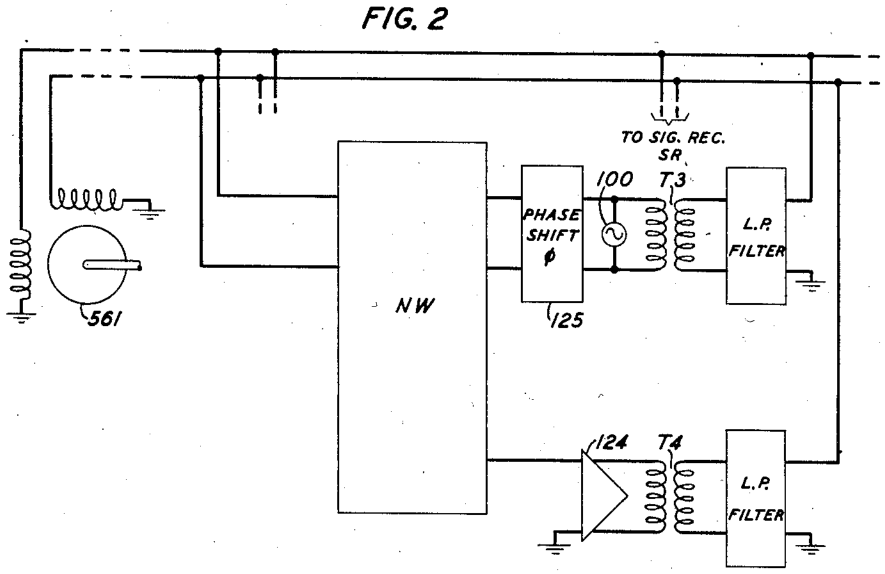
Figure 3:
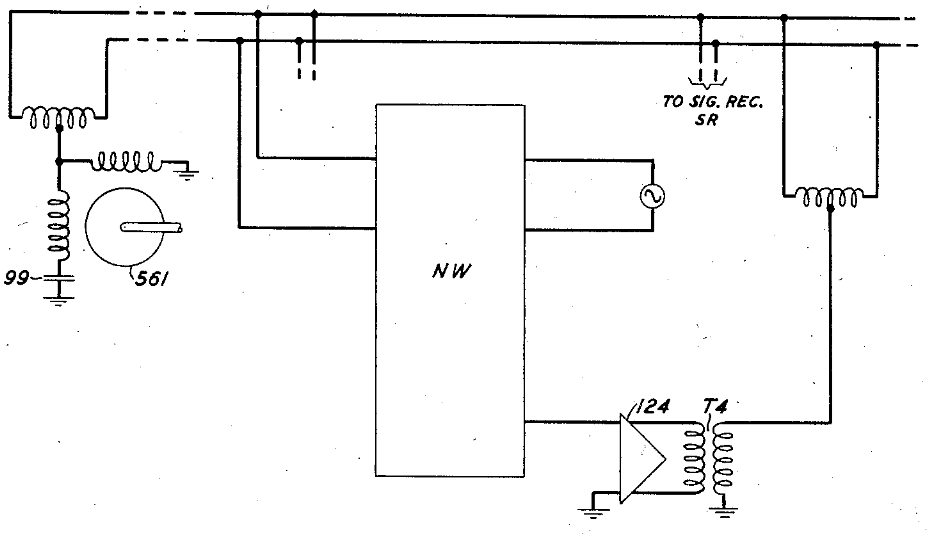

These and other features of the invention will be readily understood from the following detailed description when read with reference to the accompanying drawings, in which:

Fig. 1 is a circuit diagram illustrating, in part, a high speed dialing system to which the present invention is particularly applicable. In this figure, which includes a schematic showing of a telephone subscriber's station equipment including a motor-driven impulse generator, and a pilot frequency detecting and evaluating network, there is shown one method of supplying power over the subscriber's loop which involves supplying fixed phase power over a simplex of the loop, that is, over the two wires of the loop in parallel with a ground return and variable phase power over the metallic loop;

Fig. 2 shows diagrammatically an arrangement for supplying the fixed and variable power phases over the tip and ring conductors, respectively, of the line, with a ground return; and Fig. 3 shows an arrangement whereby all the power is supplied over the simplex of the line and the two phases are obtained at the subscriber's station by means of a phase splitting condenser.

Before entering into a detailed description of the system disclosed in the drawings a brief reference is made to Fig. 1. The subscriber's telephone equipment identified by the designation 550 is substantially identical to that shown in the above-identified Malthaner application and the designation transmitter 560 of the latter has been modified to include a toothed wheel rotor 101. Under control of a polar relay 556 either the telephone equipment 550 or the motor-driven designation transmitter 560 is connected to the subscriber's line 565 in a manner fuly set forth in the aforesaid Malthaner application. The toothed wheel generator 101 and its associated pick-up coil 106 serve to generate and impress on the line 565 a pilot frequency which identifies a predetermined normal speed of the driving motor 561. At the central office there is provided a network NW which includes an input transformer T1, and amplifier V1A-V1B, a grid-controlled phase sensitive rectifier V2A-V2B and a modulator bridge which normally includes the vacuum tube V3A-V3B and the secondary or left windings of transformer T2. A source of single phase 60-cycle current is shown at 100 which is connected to the primary of transformer T2 by way of a phase shift circuit 125 and directly to the primary of transformer T3. The grounded secondary of T3 together with the divided secondary of transformer T4 constitute the centrol office termination of a circuit simplexed on the line extending to the subscriber's station and terminating in the similarly arranged windings 104 and 105 of the motor 561.

The network NW, which receives only the pilot frequency generated at the subscriber's station, is so designed that when the frequency of this pilot wave is at that predetermined frequency which identifies normal operating speed of the motor 561 and corresponds to the resonant frequency of the circuit 114–115, the aforementioned modulator bridge is in a condition of balance. Under this condition only the fixed phase of the power source 100 is transmitted over the simplex of the line to the subscriber's station with the result that the two-phase motor 561 receives no driving power. However, when the pilot frequency varies from the predetermined precise frequency to identify a corresponding deviation of the motor shaft from normal speed, the modulator bridge is unbalanced so that 90-degree out-of-phase power from the source 100 by way of transformer T2 is impressed on the input of the power amplifier 124 for transmission over the metallic loop by way of transformer T4 to influence the speed of rotation of the motor 561.

Since, normally, the motor 561 is at a condition of rest and therefore no pilot frequency is available to activate the network NW, it is necessary that provision be made to unbalance the modulator bridge prior to the availability of the pilot frequency. To this end vacuum tube V4A–V4B is provided which, incident to the initiation of a call at the subscriber's station, is rendered conductive to thereby disturb the balanced condition of the bridge and cause the projection of variable phase power over the line by way of transformer T4 to start the motor 561.

The tube portions V4A and V4B cooperate in such a manner that after the motor has started and the generated pilot frequency reaches the predetermined precise value, the tube portion V4B becomes blocked out thus leaving the variable phase voltage for driving the motor under control of the modulator tube V3A-V3B.

The polar relay 556 responds to polarity changes in a manner fully described in the hereinbefore identified Malthaner application to control the telephone equipment 550 and the designation transmitter 560 in so far as their connections to and disconnections from the line 565 are concerned.

A more detailed description of the system disclosed in the drawings and its operation follows.

As set forth in the aforementioned Malthaner application a subscriber at station 550, for example, to initiate a call sets the calling dial 560 in accordance with the telephone number, or desigation of the station to be called and lifts the telephone handset, including the receiver 552 and the transmitter 553, from its cradle support. In thus initiating a call the calling subscriber sets into operation, in a manner fully described in the Malthaner application, equipment at the central office which functions to extend the calling line to signal receiving and recording equipment such as is schematically indicated at SR in Fig. 1 of the drawings of the instant application.

When such connection is effected and assuming the designation transmitter 560 has functioned, in a manner to be fully described hereinafter, to transmit signal pulses identifying the designation of the called station, the transmitted pulses are received, recorded and checked in a manner fully described in the above-identified Malthaner application. Thereafter, the recorded pulses are employed to selectively control switches to extend the calling subscriber's line 565 to the called subscriber's line. When the selection of the called subscriber's line is completed a polarity reversal on the line is effected to cause relay 556 to move its armature from the right contact to the left contact; the designation transmitter 560 accordingly is disconnected from the line and the subscriber's telephone equipment 550 substituted therefor. If the called line is busy, the calling subscriber receives busy tone and thereupon restores the handset to its support. Should the subscriber desire to call the same number at a later time it will be noted that the calling equipment is already set to the desired number so that he need now only lift the handset from its support. If the called line is idle, ringing current is applied to it. When and if the called subscriber answers, the ringing current is disconnected from his line; the proper electrical condition is applied to his line to cause the telephone transmission apparatus at the called subscriber's station to be connected to his line; and the communication path between the calling and called stations is established. At the completion of the call the involved circuits and apparatus are returned to their normal or idle condition.

The foregoing description covers briefly and in general terms the traffic involved in the initiation, completion and termination of a connection between calling and called subscribers' stations of a system to which the present invention is particularly applicable. The above-identified Malthaner application embodies a complete description of such a system. The present invention is concerned only with the speed control of the motor 561 at the calling subscriber's station, which motor drives the signal transmitter 562 and also the pilot frequency, or tone generator 101.

When the calling subscriber, after having set the dialing mechanism in accordance with the telephone number of the called line, removes the telephone handset from its cradle support the switchhook spring 554 is moved from its back contact to its front contact thus connecting the winding of polar relay 556 to the line 565. The closure of the loop at the subscriber's station initiates a series of circuit operations including the operation of a start relay, as fully set forth in the Malthaner application, which results in the connection of negative battery to the tip conductor of the line and ground to the ring conductor. Under this condition the armature of polar relay 556 remains in engagement with the right contact as shown in the drawing. Thus the calling or dialing equipment 560 is connected to the line and the line is extended to the network NW. The connection of negative battery and ground to the tip and ring conductors, at this time, as set forth in the Malthaner application, originates in the register. The circuit includes the windings of relay 1154 of the register and the back contacts and armatures of relay 718 of the junctor. Also, it will be noted that under this condition relay 1152 operates and, in the present application, connects positive potential to conductor 130 (conductor S in the Malthaner application) for a purpose to be described presently.

The input to the network NW is connected to the line 656 by way of a pilot frequency filter 107 which is designed to pass the pilot frequency generated at the calling subscriber's station by the toothed wheel generator 101 incident to the rotation of the driving motor 561. The motor obviously is at rest prior to the initiation of the call.

The source 100 of 60-cycle power located at the central office is connected across the primary winding of transformer T3 and also across the primary winding of transformer T2 by way of a phase shift circuit 125. Thus power from the source 100 is transmitted to the calling subscriber's station over a simplex circuit including the grounded secondary winding of transformer T3, the two halves of the secondary winding of transformer T4, over the two conductors of the established connection by way of the filter 102, spring 554 and its upper contact, armature of relay 556 and its right contact, motor windings 104 and 105 to ground. The two-phase motor 561 obviously does not operate on this power.

For present descriptive purposes it will be assumed that the modulator bridge including the tube V3A—V3B and the secondary winding of transformer T2 is in a condition of balance. Under this condition the power frequency from the source 100 by way of the phase shift circuit 125 does not appear in the plate circuit of the modulator tube V3A—V3B and hence no voltage appears across resistor 122. The transformer T4 does not at this time receive power from the power source 100 by way of the power amplifier 124.

In order to start the motor 561 incident to the initiation of the call, the vacuum tube V4A—V4B is provided. The cathode and plate of tube half V4B are connected in parallel with those of tube half V3B. The grid of tube half V4B has a positive voltage supplied by way of conductor 130 as previously described so that under this condition the tube conducts and, therefore, unbalances the modulator bridge with the result that a voltage appears across the resistor 122 and is impressed on the power amplifier 124 and thence over the metallic loop by way of the transformer T4, filter 102, line conductors, switchhook and polar relay contacts and the windings 104 and 105 of the motor 561. This voltage being derived from the source 100 by way of the phase shift circuit 125 is of such phase as to effect the operation of the motor.

The tone generator 101, being fixed to the shaft of motor 561, develops a pilot frequency which is suitably spaced from the frequency of the power source 100 and from the frequency of the signals transmitted by the transmitter 562 and picked up by coil 106 and transmitted over the line 565 to the input of network NW by way of the pilot filter 107. This pilot frequency is thus impressed on the primary winding of transformer T1, is amplified in the tube half V1B and is supplied, by way of condenser 131, to the plate and grid of tube half V4A which functions as a rectifier. The rectified voltage is impressed upon the grid of tube half V4B by way of resistor 132. Condenser 133 shunts the alternating-current components of the rectified voltage to ground. As the motor approaches correct normal speed the pilot frequency nears a corresponding correct value and as this occurs, the rectified voltage impressed upon the grid of tube half V4B is large enough to completely cut this tube off, leaving the variable phase voltage for driving the motor under control of the modulator V3A—V3B.

The motor functions to drive the signal transmitter 562 and thereby to effect the transmission of the called station-identifying pulses in a manner fully disclosed in the above-identified Malthaner application.

It is to be understood that as the motor 561 reaches its precise normal speed of rotation the modulator bridge again assumes a condition of balance and no variable phase power is transmitted over the metallic loop by way of transformer T4.

It will now be assumed that motor 561 is running at the correct velocity. The corresponding pilot frequency output of coil 106 therefore, is transmitted over the line 565 and passes through the pilot frequency filter 107 to transformer T1. This filter is employed in order to block the motor power frequency from the central office source 100 and also the dialing frequencies picked up by the signal transmitting coil 563.

The pilot frequency is stepped up in voltage in transformer T1 and is impressed upon the grids of the two halves V1A and V1B of the twin triode tube. The voltage on the grids of this tube is amplified in its plate circuits and impressed upon the anodes or plate electrodes of the two halves V2A and V2B of the second twin triode tube which tube functions as a grid controlled phase sensitive rectifier.

In the cathode circuit of the tube V1A—V1B a resistor 108 supplies a small negative bias for the tube. Resistors 109 and 110, through which grid current must flow, are large in value. In practice, the grid voltage should be of sufficient amplitude to considerably overload the tube and, therefore, cause it to function as a limiter. Resistances 112 and 113 are low in value and serve to couple a tuned circuit comprising inductance 114 and capacitance 115 to the cathodes of the tube halves V1A and V1B. Condenser 116 connects the common terminal *x* of the tuned circuit 114—115 to the grids of the tube halves V2A and V2B.

The alternating-current voltage at the common terminal *x* will be 90 degrees out of phase with the plate voltage of the amplifier tube V1A—V1B when the pilot frequency of the source 101—106 corresponds exactly with the resonant frequency of the tuned circuit 114—115. For small deviations from this frequency the phase shift varies almost linearly and its sign changes depending upon whether the pilot frequency is higher or lower than the correct value, that is, the resonant frequency of the tuned circuit 114—115.

The tube comprising tube halves V2A and V2B is self-biased due to the fact that the grid current flows through grid resistor 117. A small positive voltage is supplied through the plate load resistors 118 and 119.

The voltages on the plates of tube halves V2A and V2B appear on the grids of corresponding tube halves V3A and V3B after passing through filter F. This filter is used to suppress the pilot frequency and its harmonics. The tube halves V3A and V3B function as a modulator. They are biased near plate current cut-off by cathode resistor 120. Alternating-current voltages across resistor 120 are substantially suppressed by condenser 121.

When the pilot source has precisely the correct frequency, no differential voltage will appear between the plate circuits of the tube halves V2A and V2B. If the pilot frequency is not precisely at the correct value the phase relation between the grid and plate voltages of the tube halves V2A and V2B will no longer be 90 degrees and a differential voltage will appear between the plates of these tube halves.

The modulator comprising tube halves V3A and V3B is normally balanced so that the power frequency of the source 100 injected into its cathode circuit by way of transformer T2 does not appear in its plate circuit, as previously mentioned. However, a differential voltage appearing between its two grids will unbalance the modulator to the extent that the power frequency from source 100 will appear in its plate circuit, the magnitude thereof depending upon the degree of unbalance between the tube halves V3A and V3B and the phase upon the polarity of the unbalance. This alternating-current voltage in the plate circuit appears across plate resistor 122. Condenser 123 connected across resistor 122 serves as a shunt to ground for any remnant of the pilot frequency or its harmonics as well as the harmonics of the power frequency. The voltage across resistance 122 is impressed on the input of the power amplifier 124 and thence on the primary of transformer T4 and over the metallic loop to energize the windings 104 of motor 561 in a manner indicative of the magnitude and phase of the unbalance of the modulator bridge and therefore of the extent and phase of the deviation of motor 561 from normal speed. The projection of this power over the metallic loop results in an adjustment of the speed of rotation of the motor, slowing down the motor if the detected deviation indicates a speed in excess of normal speed and stepping up the motor speed if the deviation indicates a speed below normal speed.

The phase shift circuit 125 is adjusted so that any output voltage of the power amplifier 124 will be plus or minus 90 degrees out of phase with the fixed phase voltage, the sign depending upon the polarity of unbalance of the modulator V3A–V3B. The amplifier 124 is required to pass only a norrow band of frequencies centered about the power frequency and may be of any well-known type.

From the foregoing it is apparent that the motor 561 will be maintained at substantially its normal speed of rotation and that any deviation from this speed will result in a corresponding voltage drop across the resistance 122 and the projection of a corresponding magnitude of variable phase power over the metallic loop by way of the power amplifier 124 and the associated transformer T4 to restore the motor to normal speed.

As set forth in the hereinbefore-identified Malthaner application, after the station-designating impulses have been transmitted, checked and recorded, a reversal of the battery and ground connections to the calling subscriber's line is effected causing relay 556 to move its armature from the right contact to the left contact. This results in the disconnection of the calling equipment 560 from the line and the connection of the calling subscriber's communication apparatus to the line. This polarity reversal results from the operation of relay 718 in a manner fully described in the Malthanel application. The battery and ground connections to the line are by way of the windings of relay 1154 and the front contacts and armatures of relay 718.

Figs. 2 and 3 show other methods of supplying power over the loop. In Fig. 1, as described, the fixed phase power is supplied over a simplex of the loop, that is, over the two wires in parallel with a ground return. The variable phase power from the power amplifier is supplied through the low-pass filter 102 and over the metallic loop. Since the impedance of the subscriber's telephone set can be large at signal and pilot frequencies a low-pass filter is not required at the subset.

In Fig. 2 the two phases of power are supplied over the tip and ring conductors, respectively, with a ground return.

In Fig. 3 all the power is supplied over the simplex of the line and the two phases are obtained at the subset by the use of a phase splitting condenser 99.

What is claimed is:

1. In a telephone system, a subscriber's station, a central office, a line interconnecting said station and said central office, an impulse transmitter at said station, a two-phase motor at said station connected to said line and responsive to the transmission of fixed phase power and variable phase power over said line from said central office for driving said impulse transmitter, a source of single phase power at said central office, means for applying fixed phase power from said source to said line, means for applying variable phase power from said source to said line, means for detecting variations in the speed of rotation of said motor and for transmitting to said central office over said line corresponding frequency waves, and means at the central office responsive to the transmitted frequency waves for enabling said variable phase power applying means only when the frequency of the transmitted waves deviates from a predetermined frequency.

2. In a telephone system, a subscriber's station, a central office, a line interconnecting said station and said central office, an impulse transmitter at said station, a two-phase motor at said station connected to said line for driving said impulse generator, a source of single phase power at said central office, means controlled by said motor for generating a pilot wave whose frequency is a measure of the speed of rotation of said motor, means including said line for transmitting the generated pilot wave to said central office, means for applying fixed phase power from said source to said line, means for applying variable phase power from said source to said line, the application of only fixed phase power to said line being ineffectual to drive said motor, frequency detecting means at said central office, and means controlled by said frequency detecting means for enabling said variable phase power applying means to said line only when the frequency detected by said frequency detecting means is other than a predetermined frequency.

3. In a telephone system, a subscriber's station, a central office, a two-wire line interconnecting said station, and said central office, an impulse transmitter at said station, a two-phase motor at said station for driving said transmitter, said motor having one winding connected across said line and a regulating field winding connected between ground and the midpoint of said first winding and said motor having a normal predetermined speed of rotation, a source of single-phase power at said central office, a first power transmitting path extending from said central office source to said station including the two wires of said line in parallel and a ground connection at said central office, a second path comprising a closed metallic loop including the two wires of said line, means for applying power from said source to both said circuits to energize both windings of said motor and to cause said motor to operate, means for detecting a deviation in the speed of said motor from its normal predetermined speed of rotation, and means controlled by said detecting means for inhibiting the transmission of power over one of said circuits when said motor is operating at its normal predetermined speed.

4. In combination in a telephone system, a subscriber station, a central office, a line interconnecting said station and said central office, an impulse transmitter at said station, a motor connected to said line at said station and responsive to the projection over said line of variable phase power for driving said impulse transmitter, a source of single phase power at said central office, means including a bridge circuit for controlling the projection of variable phase power from said source over said line to said station to operate said motor, frequency detecting means for maintaining said bridge in a balanced condition incident to the detection of a pilot wave of predetermined frequency and for unbalancing the bridge when a pilot wave of a frequency other than the predetermined frequency is detected, whereby said power projection means is enabled only when said bridge is in a condition of unbalance, means at said station for generating a pilot wave whose frequency is a measure of the speed of rotation of said motor, and means for transmitting the generated pilot wave over said line to said central office and impressing it on said frequency detecting means.

5. In combination in a telephone system, a subscriber's station, a central office, a two-wire line interconnecting said station and said central office, an impulse transmitter at said station, a two phase motor connected to said line at said station for driving said impulse transmitter, a source of single phase power at said central office from which fixed phase power and variable phase power for driving said motor are transmitted to said subscriber's station, a first transmitting path for the fixed phase power comprising the two wires of said line in parallel and a ground return, a second transmitting path for the variable phase power comprising a metallic loop including the two wires of said line, means at said station for generating a pilot wave whose frequency is a measure of the speed of rotation of said motor, means for transmitting the pilot frequency over said line to said central office, means at the central office for detecting variations in the frequency of the pilot wave from a normal predetermined frequency, and means controlled by said frequency detecting means for adjusting the power transmitted over said second path in accordance with detected variations in the frequency of said pilot wave.

6. In a telephone system, a subscriber's station having switchhook contacts thereat, a central office, a line interconnecting said station and said central office, an impulse generator at said station, a two-phase motor at said station having a normal speed of rotation for driving said impulse generator, a source of single phase power located at said central office, a first path including the conductors of said line for transmitting fixed phase power from said motor, a second path including the conductors of said line for transmitting variable phase power from said source to said motor, means including a bridge circuit associated with said source, means normally maintaining said bridge in a balanced condition to block the transmission of variable phase power over said second path, and means controlled by the switchhook contacts at said station when operated incident to the initiation of a call at said station for completing said first path and for effecting an unbalance of said bridge circuit whereby variable phase power from said source is transmitted over said second path to cause said motor to drive said impulse generator.

7. The combination in a telephone system of a subscriber's station, a central office, a telephone line interconnecting said station and said central office, an impulse transmitter at said station, a two-phase motor at said station having a normal speed of rotation for driving said impulse transmitter, and means for controlling the operation of said motor comprising a source of single phase power at said central office, a first path including the conductors of said line for transmitting fixed phase power from said source to said motor, a second path including the conductors of said line for transmitting variable phase power from said source to said motor, means including a bridge circuit associated with said source and normally balanced to block the transmission of variable phase power over said second path, means operating in response to the initiation of a call at said station for completing said first path and for effecting an unbalance of said bridge circuit whereby variable phase power from said source is transmitted over said second path to said motor and said motor operates to drive said impulse transmitter, means for generating a pilot frequency current indicative of the speed of rotation of said motor, and means for impressing the generated current on said bridge circuit by way of said telephone line to influence the condition of balance thereof in accordance with vriations in the speed of said motor from said normal speed.

8. In a telephone system in which a motor-driven impulse transmitter is employed at a subscriber's station to transmit impulses corresponding to telephone line designations, a subscriber's station at which the impulse transmitter is located, a central office, a line interconnecting said station and said central office, a two-phase motor at said station for driving the transmitter, said motor including a pair of windings, a source of single phase power at said central office, a pair of transformers at said central office, subscriber-controlled means at said station for completing a simplex circuit including the secondary windings of said transformers, the conductors of said line and the windings of said motor, and means for subjecting said motor to fixed phase power and variable phase power from said source to control the operation of said motor comprising means for impressing fixed phase power from said source on said simplex circuit by way of the primary winding of said transformers, and means for impressing variable phase power from said source on the metallic loop of said simplex circuit by way of the primary winding of the other of said transformers.

References Cited in the file of this patent

UNITED STATES PATENTS

| | | |
|---|---|---|
| 1,981,040 | Gulliksen | Nov. 20, 1934 |
| 2,254,899 | Laubenheimer | Sept. 4, 1941 |
| 2,429,651 | Tarr | Oct. 28, 1947 |
| 2,471,916 | Volz | May 31, 1949 |
| 2,556,172 | Dunlap | June 12, 1951 |
| 2,587,635 | Lovell | Mar. 4, 1952 |